(12) United States Patent
Kamiunten et al.

(10) Patent No.: US 7,752,909 B2
(45) Date of Patent: Jul. 13, 2010

(54) FLOW SENSOR WITH NON-CONTACT TEMPERATURE DETECTING MEANS

(75) Inventors: Shoji Kamiunten, Tokyo (JP); Seishi Nakano, Tokyo (JP)

(73) Assignee: Yamatake Corporation (JP)

(*) Notice: Subject to any disclaimer, the term of this patent is extended or adjusted under 35 U.S.C. 154(b) by 90 days.

(21) Appl. No.: 11/662,121

(22) PCT Filed: Aug. 30, 2005

(86) PCT No.: PCT/JP2005/015784

§ 371 (c)(1),
(2), (4) Date: Sep. 10, 2007

(87) PCT Pub. No.: WO2006/027974

PCT Pub. Date: Mar. 16, 2006

(65) Prior Publication Data
US 2008/0210002 A1 Sep. 4, 2008

(30) Foreign Application Priority Data
Sep. 7, 2004 (JP) ............................. 2004-259774

(51) Int. Cl.
*G01F 1/68* (2006.01)
(52) U.S. Cl. .................................. 73/204.23
(58) Field of Classification Search ................ None
See application file for complete search history.

(56) References Cited

U.S. PATENT DOCUMENTS

| | | | | |
|---|---|---|---|---|
| 4,170,455 A | * | 10/1979 | Henrie | 436/144 |
| 4,519,246 A | * | 5/1985 | Hartemink | 73/202.5 |
| 4,938,079 A | | 7/1990 | Goldberg | |
| 5,291,781 A | * | 3/1994 | Nagata et al. | 73/204.26 |
| 5,717,136 A | * | 2/1998 | Aoi et al. | 73/204.26 |
| 6,386,050 B1 | * | 5/2002 | Yin et al. | 73/861.95 |
| 6,628,202 B2 | * | 9/2003 | McQueen et al. | 340/603 |
| 6,715,915 B1 | * | 4/2004 | Nakanuma et al. | 374/54 |

(Continued)

FOREIGN PATENT DOCUMENTS

JP 63-27766 2/1988

(Continued)

OTHER PUBLICATIONS

International Search Report for International Application No. PCT/JP2005/015784 dated Nov. 8, 2005.

*Primary Examiner*—Harshad Patel
(74) *Attorney, Agent, or Firm*—Cantor Colburn LLP (57) ABSTRACT

A flow sensor may include a heater for heating a partial region of the outer wall surface of a pipe forming a flow path or for heating a particular region in the pipe; and a temperature detector for measuring the temperatures of regions, the regions being on the upstream side and the downstream side of the pipe with respect to the heated region. The temperature detector may include an upstream-side non-contact temperature detector and a downstream-side non-contact temperature detector arranged near the outer wall surface of the pipe in a state of being not in contact with the outer wall surface, and the non-contact temperature detectors can measure the temperatures of the upstream-side heat energy radiating region and downstream-side heat energy radiating region in a state of being not in contact with the outer wall surface of the pipe.

15 Claims, 10 Drawing Sheets

U.S. PATENT DOCUMENTS

2009/0025473 A1 * 1/2009 Imai et al. .............. 73/204.14

FOREIGN PATENT DOCUMENTS

| JP | 2-31168 | 2/1990 |
| --- | --- | --- |
| JP | 4-366727 | 12/1992 |
| JP | 7243888 | 9/1995 |
| JP | 10-9958 | 1/1998 |
| JP | 11-264769 | 9/1999 |
| JP | 2000-35438 | 2/2000 |
| JP | 2002-148089 | 5/2002 |
| JP | 2003-302271 | 10/2003 |
| JP | 2003-329697 | 11/2003 |

* cited by examiner

FLOW SENSOR WITH NON-CONTACT TEMPERATURE DETECTING MEANS

CROSS REFERENCE TO RELATED APPLICATIONS

This is a U.S. national stage of application No. PCT/JP2005/015784, filed on 30 Aug. 2005. Priority under 35 U.S.C. §119(a) and 35 U.S.C. §365(b) is claimed from Japanese Application No. 2004-259774, filed 7 Sep. 2004, the disclosure of which is also incorporated herein by reference.

TECHNICAL FIELD

The present invention relates to a flow sensor for measuring the flow rate of a fluid flowing in a flow path.

BACKGROUND ART

As a flow sensor for measuring the flow rate of a fluid, there is known a thermal flow sensor for sensing the flow rate of the fluid by detecting a change in electric power or a change in resistance caused by the absorption of heat of a heater by the fluid. For example, the outer periphery of a capillary having an outside diameter of about 0.5 mm is insultingly coated with a polyimide resin, and a wire of about several tens microns insultingly coated with a polyimide resin in the same way is wound on the coated capillary on the upstream side and the down stream side as a device that is part heater and part temperature sensor. By the flow of a gas in the capillary, in the device that is part heater and part temperature sensor on the upstream side, heat is absorbed by the gas flow, and the device on the downstream side is warmed by the heat carried by the gas flow. This imbalance of heat enables the sensing of flow rate. Also, in a flow sensor described in Patent Document 1, a heater is provided on the surface of a pipe conduit in which a gas flows, and an upstream-side temperature sensor consisting of a thermistor is affixed on the surface of an upstream-side pipe conduit of this heater, and a downstream-side temperature sensor consisting of a thermistor is also affixed on the surface of a downstream-side pipe conduit. The heater, the upstream-side temperature sensor, and the downstream-side temperature sensor are wire-bonded to a ceramic substrate arranged near the pipe conduit via a gold wire. Also, the ceramic substrate is provided with a plurality of pins for taking out leads so that the output signals of the temperature sensors are taken out to the outside via the pins.

Also, a flow sensor described in Patent Document 2 has a sensor pipe and an exothermic resistor in which the sensor pipe is inserted. This exothermic resistor is formed by an ordinary ceramic pipe as a base member at the outer periphery of which platinum is deposited so as to be cut off in a spiral shape by means of laser processing or trimming, so that a platinum pattern in a spiral shape is thereby formed. Also, a conductive ring is fitted at both ends of the ceramic pipe. The conductive ring plays a role of a base section to which a lead wire is connected.

Also, unlike the flow sensors described above-mentioned Patent Documents, there is known a technique in which a gas flow near a heating element is monitored visually by taking a picture of the cooling condition of a heated metal wire caused by a metal wire using an infrared camera (for example, refer to Patent Documents 3 to 6).

Patent Document 1: Japanese Patent No. 3424974 (page 2. FIG. 1)

Patent Document 2: Japanese Unexamined Patent Application Publication No. 4-366727 (pages 2 and 3, FIG. 1)

Patent Document 3: Japanese Unexamined Patent Application Publication No. 11-264769 (pages 3 and 4, FIG. 1)

Patent Document 4: Japanese Unexamined Patent Application Publication No. 2000-35438 (pages 2 and 3, FIG. 1)

Patent Document 5: Japanese Unexamined Patent Application Publication No. 2-31168 (pages 2 and 3, FIG. 1)

Patent Document 6: Japanese Unexamined Patent Application Publication No. 63-27766 (pages 1 and 2, FIG. 1)

As described above, in some cases, a heating section and a temperature detecting section consisting of a winding, a thin-film resistor, and the like are formed in a closely contacting manner on the outer wall surface of a pipe constituting a flow path. In these cases, the work generally involves difficulties, and cannot go beyond the bounds of hand making, so that the mass-producing ability and the uniformity of products are poor. In addition, the pipe constituting the flow path is often formed of a metal (electric conductor) such as stainless steel. Therefore, in order to form the temperature detecting section consisting of a winding, a thin-film resistor, and the like on the outer wall surface of the pipe in a closely contacting manner, it is necessary to interpose an insulating film therebetween. Since many of the insulating films basically have a low heat conductivity as compared with a metal, if the thickness of the insulating film is increased, the heat conduction becomes poor, and the sensitivity and response of the temperature detecting section decrease. On the other hand, if the thickness of the insulating film is decreased, there arises a problem in that the withstand voltage becomes low. Also, in some cases, the internal stress of the temperature detecting section is changed by the time change of the insulating film itself, causing an error, or the insulating film itself deteriorates and peels off the outer wall surface of pipe, disabling exact temperature measurement.

Also, in the case where a discrete temperature sensor such as a thermistor is used in the temperature detecting section, a construction is conceivable in which the temperature sensor is mechanically clamped on the outer peripheral surface of pipe conduit and is brought into close contact with the outer peripheral surface of pipe conduit by interposing a highly heat conductive grease between the temperature sensor and the outer peripheral surface of pipe conduit in place of an adhesive. In this construction, however, the grease itself may change with time, or the characteristics of the temperature sensor may change due to a stress generated in clamping, a stress caused by tightening connection between pipe couplers, and torsion of the pipe itself, so that exact temperature measurement is difficult to make.

On the other hand, since a resin-made pipe has a poor heat conductivity, even if the heating section and the temperature detecting section are formed on the outer wall surface of pipe in a closely contacting manner, accurate temperature detection cannot be carried out, so that the flow rate cannot be measured exactly.

Further, the work for taking an electrode out of the winding having an outside diameter of about several tens microns, which is formed on the outer wall surface of the capillary pipe having an outside diameter of about 0.5 mm constituting the flow path, the thin-film resistor having a pattern width of about several microns to several tens microns, and the like poses a big problem in manufacture. Careful attention must be paid to prevent the winding, the thin-film resistor, etc. from being damaged or stressed, to prevent the balance of resistance value from being lost, to prevent the heat capacity of capillary from increasing, and to prevent the heat balance from being lost.

Also, in the configuration in which the thermistor is directly affixed on the outer peripheral surface of pipe conduit as in the case of the flow sensor described in Patent Document 1, a signal must be taken out of the thermistor via wire bonding, and such a signal taking-out construction has the same problems as described above and difficulties in manufacturing.

On the other hand, even if the special conductive ring as described in Patent Document 2 is used to simplify the electrode taking-out construction, and a lead wire consisting of a platinum foil is resistance welded to the ring, the same problems as described above and the difficulties in manufacturing remain.

The flow sensor described in Patent Documents 3 to 6 merely monitors a thermal change near the heating element visually by taking a picture of the heat releasing condition and the cooling condition of the heated metal wire caused by a gas flow using an infrared camera, and does not quantitatively measure the flow rate of a fluid to be measured in the flow path formed by a particular pipe conduit.

DISCLOSURE OF THE INVENTION

An object of the present invention is to provide a flow sensor for exactly measuring the flow rate of a fluid flowing in a flow path in a non-contact manner.

To solve the above problems, the present invention provides a flow sensor for detecting the flow rate of a fluid to be measured flowing in a flow path, including a heating means for heating a partial region of the outer wall surface of a pipe forming the flow path or for heating a particular region in the pipe; and temperature detecting means for measuring the temperatures of heat energy radiating regions for radiating the temperature influence from the heated region to the outside as heat energy (infrared rays), the heat energy radiating regions being regions on the upstream side and the downstream side of the pipe with respect to the heated region, characterized in that the temperature detecting means consist of an upstream-side non-contact temperature detecting means and a downstream-side non-contact temperature detecting means arranged near the outer wall surface of the pipe in a state of being not in contact with the outer wall surface, and the non-contact temperature detecting means can measure the temperatures of the upstream-side heat energy radiating region and downstream-side heat energy radiating region in a state of being not in contact with the outer wall surface of the pipe; and the flow rate of the fluid to be measured flowing in the flow path is measured from the temperature difference between the temperatures of the upstream-side heat energy radiating region and downstream-side heat energy radiating region measured by the non-contact temperature detecting means or from the output caused by the temperature difference.

Since the temperature of fluid to be measured in a pipe conduit can be detected in a non-contact manner, unlike the conventional example, in the case where a temperature sensor is attached directly to the outer peripheral surface of the pipe conduit, an insulator interposed between the temperature sensor and the outer peripheral surface of the pipe conduit is not deteriorated, or the temperature sensor is not subjected to an influence of stress developed in the insulator and the pipe conduit, and thereby the flow rate can be measured exactly for a long period of time. Also, electrode taking-out work that involves difficulties in manufacturing need not be performed for the temperature sensor attached to the outer peripheral surface of pipe conduit.

Also, at least an embodiment of the flow sensor is characterized in that the non-contact temperature detecting means consists of an infrared sensor.

Some infrared sensors such as a thermopile, bolometer, and pyroelectric element are small in size, high in performance, and low in cost, and therefore are most preferable when being used as the temperature detecting means of the flow sensor.

Also, at least an embodiment of the flow sensor is characterized in that a heat energy radiating means which absorbs heat transferred from the heated region and radiates the heat to the outside is provided in the upstream-side heat energy radiating region and the downstream-side heat energy radiating region on the wall surface of or within the pipe forming the flow path.

The heat energy radiating means efficiently radiates the heat energy transferred from the heated region toward the temperature detecting means in addition to the pipe itself or in place of the pipe itself. Therefore, even in the case where the pipe conduit is formed of, for example, a resin material, the flow rate can be measured exactly.

Also, at least an embodiment of the flow sensor the flow sensor is characterized in that the heat energy radiating means is formed of a material having a high heat conductivity arranged on the wall surface of or within the pipe forming the flow path.

High heat conductivity makes the absorption of heat in the heated region easy, so that the flow rate can be measured with high response.

Also, at least an embodiment of the flow sensor the flow sensor is characterized in that at least a part of the heat energy radiating region in which the temperature is measured in a non-contact manner by the non-contact temperature detecting means or at least a part of the heat energy radiating means has a black color.

Since the black portion has an emissivity of about 1, the heat absorption and radiation efficiency is improved, and the temperatures of the energy radiating region and the radiating means can be measured effectively, by which accurate measurement of flow rate is realized.

Also, at least an embodiment of the flow sensor is characterized in that an energy shielding means is provided between the heating means and the non-contact temperature detecting means to prevent the heat energy radiated from the heating means from being transmitted directly to the non-contact temperature detecting means.

By preventing the energy radiated from the heating means from being transmitted directly to the non-contact temperature detecting means, the temperatures of the upstream-side heat energy radiating region and the downstream-side heat energy radiating region of the pipe conduit or the fluid in the pipe conduit can be measured exactly, and thereby accurate measurement of flow rate is realized.

Also, at least an embodiment of the flow sensor the flow sensor is characterized in that the upstream-side non-contact temperature detecting means and the downstream-side non-contact temperature detecting means are arranged in a common member for keeping the temperatures of the temperature detecting means themselves almost uniform.

If the temperature of the temperature detecting means itself shifts, an error in measuring the flow rate occurs. However by arranging the temperature detecting means in the common member, such an error in measuring the flow rate is prevented from occurring.

Also, at least an embodiment of the flow sensor is characterized in that both of the heating means and the non-contact temperature detecting means are arranged in a header a part of which is inserted in the flow path of the pipe.

For example, in the case where the flow rate of fluid to be measured in a large-diameter pipe is measured, since the wall thickness of pipe is large and hence the heat capacity is high, heat energy necessary for measuring the flow rate cannot be given, or a change in temperatures of the upstream-side heat energy radiating region and the downstream-side heat energy radiating region according to the flow rate cannot be produced. However, the heating means and the non-contact temperature detecting means are arranged near a thin-wall portion in the header and a part of the header is inserted in the pipe to bring the thin-wall portion into contact with the fluid, by which the flow rate can be measured surely.

Also, at least an embodiment of the flow sensor is characterized in that a housing is provided to keep the heated region and the upstream-side and downstream-side heat energy radiating regions in a vacuum or decompressed state.

By isolating the flow rate measurement region from the ambient atmosphere, exact temperature measurement can be made without being subjected to disturbance from the ambient atmosphere, and thereby accurate measurement of flow rate can be realized.

Also, at least an embodiment of the flow sensor is characterized in that a control means is provided to control the heating means so that the sum or the average value of the temperatures which are detected by the upstream-side non-contact temperature detecting means and downstream-side non-contact temperature detecting means is always higher by a certain value than the ambient temperature.

Since the temperature of the heater itself is controlled properly via the temperature detected by the temperature detecting means, there is no need for providing the heater itself with the function of temperature sensor or installing an external temperature sensor, so that the degree of freedom in designing increases.

Also, at least an embodiment of the flow sensor is characterized in that a correcting means is further provided to make substitute zero point correction by subtracting the output obtained by the non-contact temperature detecting means in a state in which heating by the heating means is stopped from the output obtained by the non-contact temperature detecting means at the time of heating by the heating means.

Even in the case where the zero point (output at the time of zero flow rate) cannot be calibrated by stopping the flow of fluid to be measured, a shift of zero point caused by the time change etc. of the non-contact temperature detecting means is corrected by this substitute zero point correction, and thereby the detection accuracy can be maintained.

BRIEF DESCRIPTION OF THE DRAWINGS

FIG. 4 is schematic construction views showing a third modification of the flow sensor shown in FIG. 1, FIG. 4(a) being a schematic view showing a pipe, a heat energy absorbing member, and a heat energy radiating member in cross section along the lengthwise direction of a pipe conduit, and FIG. 4(b) being a schematic view showing the pipe in cross section along the pipe conduit end face direction, corresponding to FIG. 4(a);

FIG. 5 is schematic construction views showing a fourth modification of the flow sensor shown in FIG. 1, FIG. 5(a) being a schematic view showing a pipe, a heat energy absorbing member, and a heat energy radiating member in cross section along the lengthwise direction of a pipe conduit, and FIG. 5(b) being a schematic view showing the pipe in cross section along the pipe conduit end face direction, corresponding to FIG. 5(a);

BEST MODE FOR CARRYING OUT THE INVENTION

Figure 1:
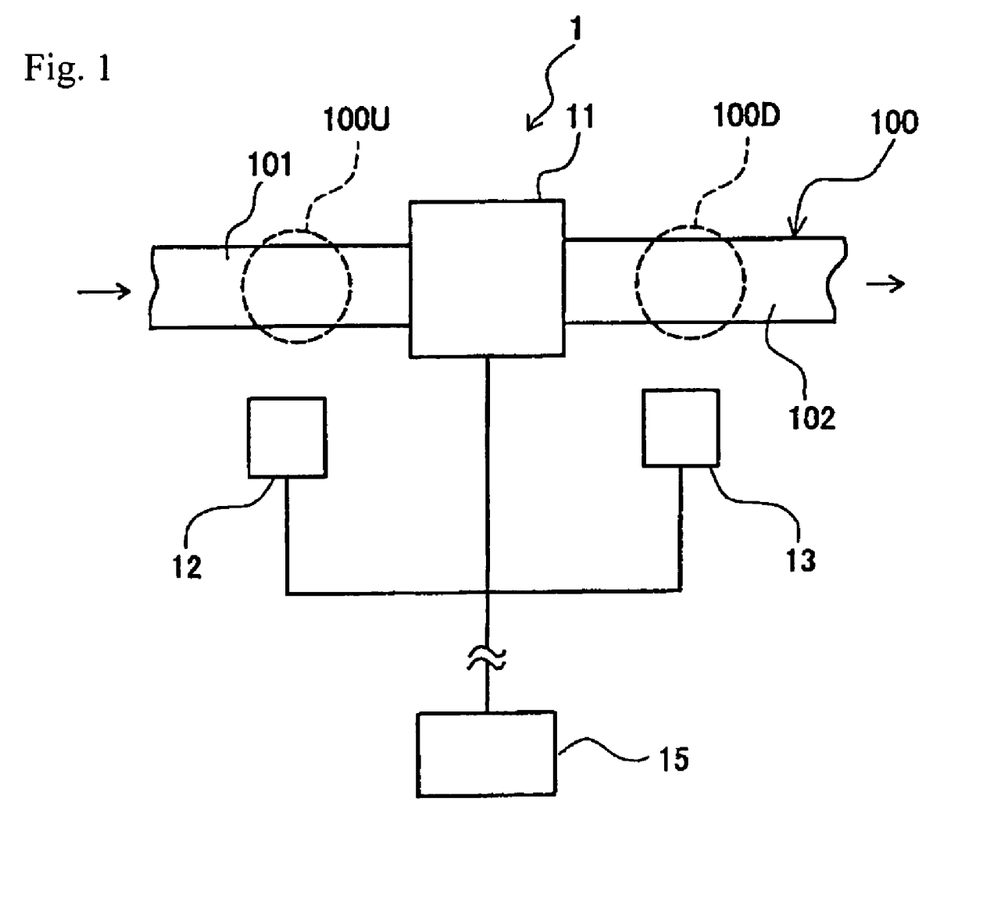
FIG. 1 is a plan view schematically showing a flow sensor in accordance with one embodiment of the present invention.

One embodiment of the present invention will now be described with reference to the accompanying drawings. As shown in FIG. 1, a flow sensor 1 in accordance with one embodiment of the present invention includes a heater (heating means) 11 attached to a part of a pipe 100 constituting a flow path to heat a part of the outer wall surface of pipe, infrared ray detecting sensors (non-contact temperature sensors) 12 and 13 for measuring the temperatures of outer wall surface portions of an upstream-side pipe 101 and a downstream-side pipe 102 of a portion heated by the heater 11 for the pipe 100 in a non-contact manner, respectively, and a control processing section 15 for controlling the heating value of the heater 11 and determining the flow rate of a fluid flowing in the pipe 100 from the temperature difference between the upstream-side infrared ray detecting sensor 12 and the downstream-side infrared ray detecting sensor 13 of the infrared ray detecting sensors 12 and 13.

The pipe 100 in which a fluid to be measured flows consists of, for example, a metallic pipe conduit, and the heater 11 consists of an electric resistor such as a winding coated with an insulator or a thin-film resistor. In the case where the heater 11 is a winding, the winding is wound at a predetermined position on the outer wall surface of the pipe conduit, and when it is a thin-film resistor, the thin-film resistor is formed at a predetermined position on the outer wall surface of the pipe conduit via an insulator layer.

The infrared ray detecting sensors 12 and 13 consist of non-contact temperature sensors using a thermopile, bolometer, pyroelectric element, or the like and are located in the upstream-side and downstream-side regions of the pipe, respectively, with respect to the region heated by the heater 11 to measure the temperature of a heat energy radiating region in which the influence of temperature from the heated section is radiated to the outside as heat energy. Specifically, the upstream-side infrared ray detecting sensor 12 detects the heat energy that is transmitted from the heater 11 via the pipe 100 and the fluid and is radiated from an upstream-side heat energy radiating region 100U of the pipe to the outside as infrared rays, and the downstream-side infrared ray detecting sensor 13 detects the heat energy that is transmitted from the heater 11 via the pipe 100 and the fluid and is radiated from a downstream-side heat energy radiating region 100D of the pipe to the outside as infrared rays.

Any of the thermopile, bolometer, and pyroelectric element is a thermal-type sensor for detecting infrared rays from a temperature rise caused by the radiation of infrared rays to the thermally sensitive section. For the thermopile and the bolometer, thin-film type ones manufactured by the micromachining technique are generally used. The thermopile is an infrared sensor in which a large number of thermocouples utilizing the change in contact potential caused by the temperature of the joint portion of different conductors, what is called the Seebeck effect, as the thermally-sensitive section are connected in series. For the thermopile, the construction and signal processing are simple as compared with other sensors because the thermopile does not require a bias voltage and a DC voltage output can be obtained directly, and the impedance of sensor is low. The bolometer is an infrared sensor utilizing the change caused by the temperature of the resistance component of a thermally sensitive material such as a metal or a semiconductor. The pyroelectric element is an infrared sensor utilizing the temperature dependency of the spontaneous polarization of a ferroelectric substance, and unlike the above-described two sensors, it is of a differential type that outputs only when a temperature change is produced by the radiation of infrared rays. Therefore, in order to obtain a continuous output, a chopper or shutter mechanism that interrupts infrared rays is needed.

Figure 10:
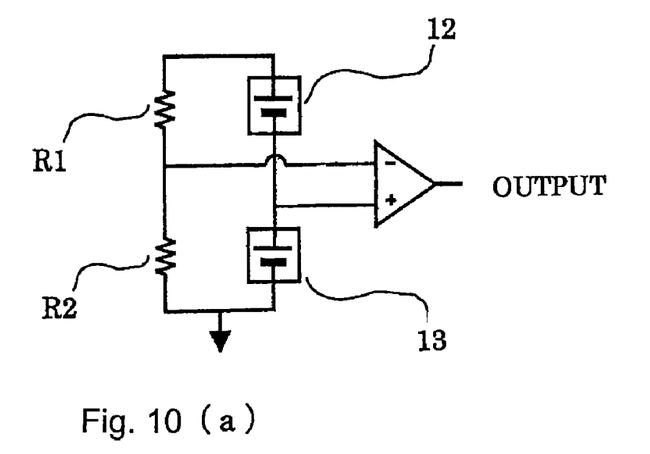
FIG. 10(a) is a schematic configuration view of an output circuit of a control processing section in a flow sensor in accordance with one embodiment of the present invention.
FIG. 10(b) is a schematic configuration view of an output circuit of a control processing section in accordance with a modification of FIG. 10(a)
FIG. 10(c) is a schematic configuration view of an output circuit of a control processing section in accordance with another modification of FIG. 10(a).

Also, the control processing section 15 is configured so as to control the heater 11 so that the sum or the average value of the temperatures determined from the upstream-side infrared ray-detecting sensor 12 and the downstream-side infrared ray-detecting sensor 13 is always higher by a certain value than the ambient temperature. Thereby, the heater 11 can be controlled so that the temperature of the heated region, which is a part of the outer wall surface of heated pipe, is always higher by a certain value than the ambient temperature without providing the heater itself with a special temperature detecting function, which increases the degree of freedom in designing the heater. Herein, it is preferable that the ambient temperature is measured by a separately installed temperature sensor, and thereby the temperature of fluid to be measured be measured, but in some cases, the pipe temperature or the ambient temperature around the pipe can be substituted. Also, in the case where the use temperature range is narrow or in the case where the temperature characteristics are corrected separately, the ambient temperature is not used for the control of heater, and the heater may be operated by a constant voltage, constant current, constant electric power, or the like. By providing the heater itself with a temperature detecting function, the heater 11 may be controlled so that the temperature of the heated region, which is a part of the outer wall surface of heated pipe, is always higher by a certain value than the ambient temperature. Also, a portion near the pipe wall of a portion heated by the heater may be separately provided with a non-contact temperature detecting function consisting of an infrared ray-detecting sensor. Also, in the control processing section 15, a circuit, for example, shown in FIG. 10(a), 10(b), or 10(c), such as a bridge circuit is formed by the upstream-side infrared ray-detecting sensor 12 and the downstream-side infrared ray-detecting sensor 13. The heat in the region heated by the drive of the heater 11 is transmitted via the pipe and the fluid to the upstream-side heat energy radiating region 100U and the downstream-side heat energy radiating region 100D, and the temperature of the upstream-side heat energy radiating region 100U and the temperature of the downstream-side heat energy radiating region 100D are made different (lower on the upstream side) by forced convection (heat transmission) caused by the flow of fluid to be measured. These temperatures are detected by the upstream-side infrared ray detecting sensor 12 and the downstream-side infrared ray detecting sensor 13, and the temperature difference between the upstream-side heat energy radiating region 100U and the downstream-side heat energy radiating region 100D is detected as the flow rate of fluid to be measured by the aforementioned control processing section 15 having the bridge circuit etc. FIG. 10(b) shows one example of a circuit in which thermopiles 12S and 13S are used as the infrared ray detecting sensors 12 and 13. In this example, the two thermopiles 12S and 13S are connected so that the polarities of output voltages thereof are reverse. Therefore, when the flow rate is absent, namely, when the temperatures detected by the two thermopiles 12S and 13S are equal, the output voltages cancel out each other and therefore become zero. When the flow rate is present, namely, when there is a difference between the temperatures detected by the two thermopiles 12S and 13S, the output voltages corresponding to these temperatures are developed. In place of the formation of such a circuit, the output of the upstream-side infrared ray detecting sensor and the output of the downstream-side infrared ray-detecting sensor may be processed by the control processing section to determine the flow rate.

The measurement of flow rate can be made by examining, in advance, the relationship between the flow rate and the above-described temperature difference or the output caused by the temperature difference and making calibration.

Also, FIG. 10(c) shows one example of a circuit in which bolometers 12B and 13B are used as the infrared ray detecting sensors 12 and 13. The use of bolometers also enables the formation of a circuit having a function equivalent to that of the circuits shown in FIGS. 10(a) and 10(b).

Since the flow rate of fluid to be measured in the pipe conduit can be detected in a non-contact manner by the above-described configuration, unlike the conventional example, when the temperature sensor is attached to the outer peripheral surface of the pipe conduit, the insulator interposed between the temperature sensor and the outer peripheral surface of the pipe conduit is not deteriorated, or the temperature sensor is not subjected to an influence of stress from the insulator and the pipe. Also, electrode taking-out work that is troublesome and involves difficulties in manufacturing need not be performed to take out an output from the temperature sensor attached to the pipe conduit. As a result, the attaching work is easy, and exact measurement of flow rate can be made for a long period of time.

Next, various modifications of the flow sensor in accordance with the above-described embodiment are explained with reference to the drawings. In these modifications, the corresponding symbols are applied to elements having the same configuration as that of the above-described embodiment, and the detailed explanation thereof is omitted. Also, in FIGS. 7 to 9, the control processing section is omitted in the figures.

First, a first modification of this embodiment is explained. The first modification is a flow sensor having a construction relating to the construction of the flow sensor described in Japanese Unexamined Patent Application Publication No. 2003-329697.

Figure 2:
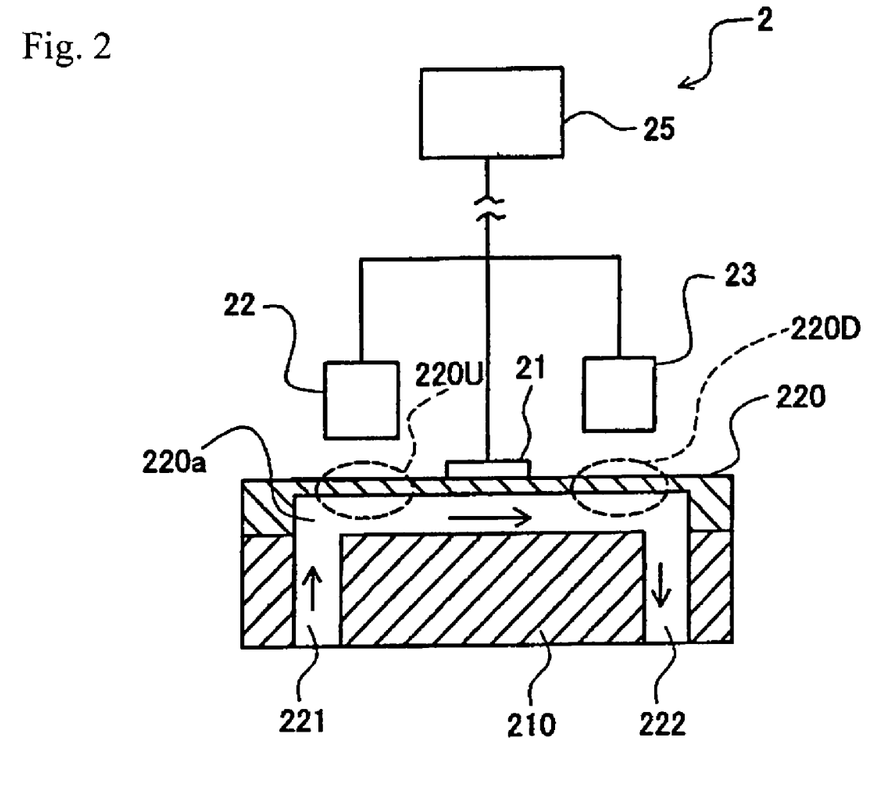
FIG. 2 is side view schematically showing a first modification of the flow sensor shown in FIG. 1, showing a base and a chip in cross section along a flow path.

As shown in FIG. 2, a flow sensor 2 in accordance with the first modification includes a base 210 and a chip 220 having a concave portion 220a, which is put over the base and forms a part of a flow path. In the base 210 of the flow sensor 2, a first flow path 221 and a second flow path 222 are formed perpendicularly to the bottom surface of concave portion of the chip 220, the first flow path 221 and the second flow path 222 forming a flow path for a fluid to be measured in cooperation with the concave portion 220a of the chip 220. The chip 220 is made, for example, of a thin stainless steel plate, an electrical insulating film is formed on the surface opposite to the flow path side, and a heater (heating means) 21 consisting of a platinum pattern is formed in a substantially central portion of the upper surface of the chip 220. Also, the heater 21 is formed with an electrode pad and a wiring metallic thin film at appropriate places. Also, on the flow path upstream side and the flow path downstream side of the heater 21, an upstream-side infrared ray-detecting sensor 22 and a downstream-side infrared ray detecting sensor 23 for measuring the flow rate of a fluid are arranged with a certain clearance being provided between these sensors and the upper surface of the chip. The upstream-side infrared ray detecting sensor (non-contact temperature detecting means) 22 and a downstream-side infrared ray detecting sensor (non-contact temperature detecting means) 23 consist of non-contact temperature sensors using a thermopile, bolometer, pyroelectric element, or the like as in the above-described embodiment, so that the temperature of an upstream-side heat energy radiating region 220U and the temperature of a downstream-side heat energy radiating region 220D of the chip 220 are respectively measured in a state in which the sensors are not in contact with the upper surface of the chip.

In the above-described flow sensor 2, the heat of the heater 21 transfers mainly in the thin-wall portion of the chip 220 and the fluid and is transmitted almost uniformly to the upstream-side heat energy radiating region 220U and the downstream-side heat energy radiating region 220D of the chip 220. By the flow of fluid to be measured in the flow path, heat transmission due to forced convection is made according to the flow rate, and a temperature difference arises between the detected temperature of the upstream-side infrared ray detecting sensor 22 and the detected temperature of the downstream-side infrared ray detecting sensor 23. This temperature difference is processed by a control processing section 25, and thereby the flow rate is measured. Since a thin stainless steel plate is used as the chip 220, and the flow path is formed on the side opposite to the side on which the heater 21 and the infrared ray detecting sensors 22 and 23 are arranged, even if the fluid to be measured is a corrosive fluid, the flow rate can be measured for a long period of time.

In the above-described configuration as well, the wall surface temperature of the thin-wall portion of the chip 220, which represents the temperature proportional to the temperature of fluid to be measured in a pipe conduit, can be detected in a non-contact manner. Therefore, unlike the conventional example, when the temperature sensor is attached to the outer peripheral surface of the pipe conduit, the insulator interposed between the temperature sensor and the outer peripheral surface of the pipe conduit is not deteriorated, or the temperature sensor is not subjected to an influence of stress developed in the pipe conduit and the insulator. Also, electrode taking-out work that is troublesome and involves difficulties in manufacturing need not be performed to take out an output from the temperature sensor attached to the pipe conduit. As a result, the attaching work is easy, and exact measurement of flow rate can be made for a long period of time.

Figure 3:
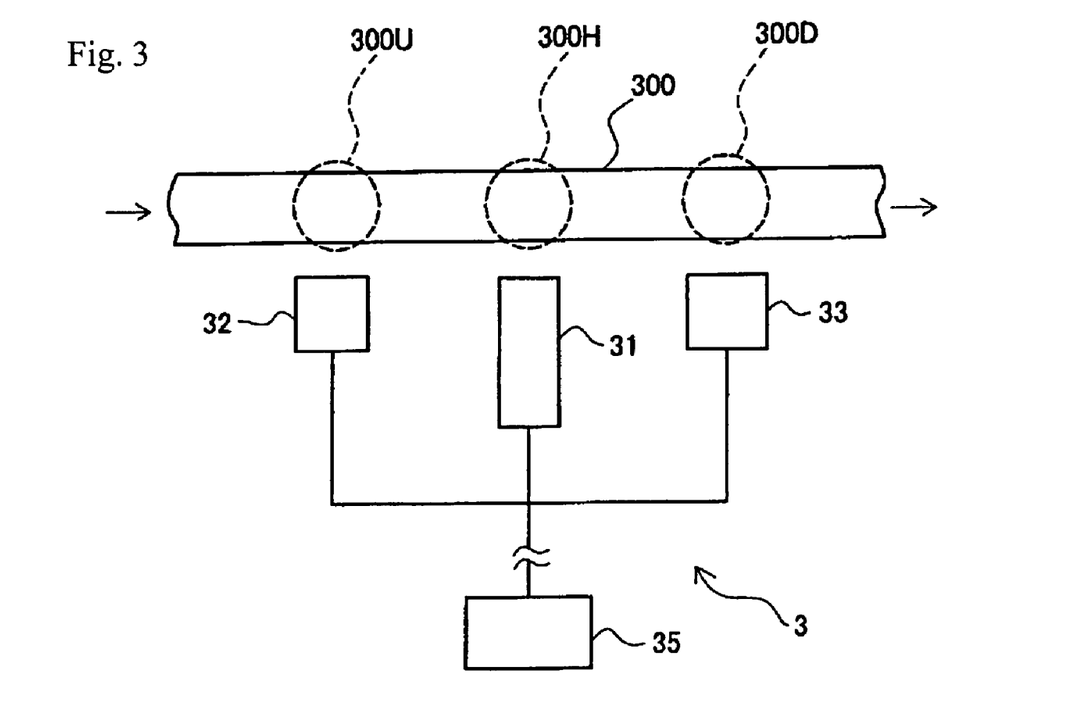
FIG. 3 is plan view schematically showing a second modification of the flow sensor shown in FIG. 1.

Next, a second modification of a flow sensor in accordance with the above-described embodiment is explained. As shown in FIG. 3, a flow sensor 3 in accordance with the second modification includes a heater (heating means) 31 that is arranged in a non-contact manner so as to be separated a certain distance from the outer wall surface of a pipe to heat a part of the outer wall surface of the pipe, infrared ray detecting sensors (non-contact temperature detecting means) 32 and 33 that are arranged near the outer wall surface portions of the pipe on the upstream side and the downstream side of the heated portion so as to be not in contact with the outer wall surface of the pipe to measure the temperatures of these portions, and a control processing section 35 that controls the heater 31 and determines the flow rate of fluid to be measured flowing in the pipe from the temperature difference between the upstream-side infrared ray detecting sensor 32 and the downstream-side infrared ray detecting sensor 33 of the infrared ray detecting sensors 32 and 33.

The heater 31 is formed near the outer wall surface of the pipe, and is configured by an energy generator (radiator) capable of supplying energy to the outer wall surface of pipe and heating a part thereof as a heated region 300H without direct heat transfer to the outer wall. Specifically, a laser, electromagnetic coil, infrared ray generator, microwave generator, or the like is used.

Also, the infrared ray detecting sensors 32 and 33 consist of non-contact temperature sensors using a thermopile, bolometer, pyroelectric element, or the like as in the above-described embodiment and the modification thereof, and are arranged in an upstream-side heat energy radiating region 300U formed on the upstream side of the region 300H heated by the heater 31 of a pipe 300 near the outer wall surface of pipe and a downstream-side heat energy radiating region 300D formed on the downstream side thereof, respectively, in a non-contact manner, so that the temperatures of these portions can be measured in a non-contact manner.

In the flow sensor 3 in accordance with the second modification, the heater 31 need not be arranged in a state of being in contact with the pipe 300, so that the flow sensor itself consisting of the upstream-side infrared ray detecting sensor 32, the downstream-side infrared ray detecting sensor 33, and the control processing section 35 can be arranged in a state of being completely not in contact with the pipe 300, and thereby a versatile flow sensor capable of being used for various pipe diameters can be realized. Also, for not only the infrared ray detecting sensors 32 and 33 but also the heater 31, electrode taking-out work that is troublesome and involves difficulties in manufacturing can be omitted.

Figure 4:
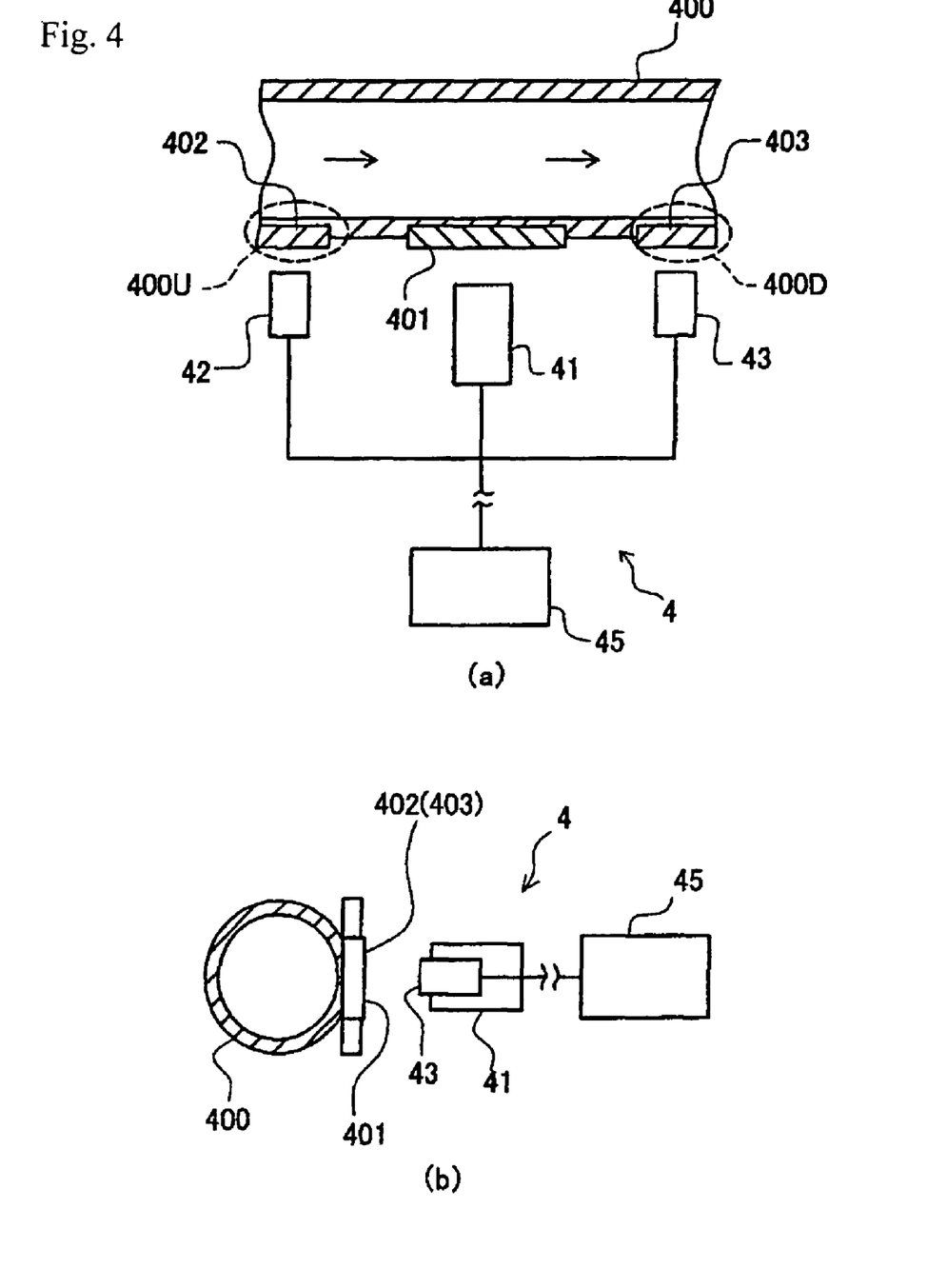

Next, a third modification of this embodiment is explained. As shown in FIG. 4, a flow sensor 4 in accordance with the third modification has an energy absorbing member 401 on the wall surface of a pipe 400 in addition to the second modification shown in FIG. 3, the energy absorbing member 401 efficiently absorbing energy radiated from a heater 41 and generating heat. In the case of this modification, the energy-absorbing member 401 is formed by a metal plate, and a part thereof is stuck fast to the wall surface of the pipe 400.

Also, on the wall surfaces of an upstream-side energy radiating region 400U and a downstream-side energy radiating region 400D on the upstream side and the downstream side of the region heated by the heater 41 of the pipe 400, there are provided energy radiating members 402 and 403 that are formed by a metal plate and measure the temperature, respectively. The heat transmitted from the energy absorbing member 401 generating heat by absorbing energy radiated from the heater 41 via the pipe and the fluid is absorbed by the energy radiating members 402 and 403, and this heat energy is radiated efficiently toward infrared ray detecting sensors 42 and 43.

The whole or a part of the energy absorbing member 401 heated in a non-contact manner and the energy radiating members 402 and 403 measuring temperature in a non-contact manner preferably has a black color. The portion blackened in this manner has an emissivity of about 1, so that the heat receiving property and the heat releasing property are high, and thus the flow rate can be measured with high sensitivity and response. Also, the energy-absorbing member and the energy radiating members have only to be formed of a material having high heat conductivity. Ceramics or sapphire may be used in place of the metal plate. Since the energy absorbing member 401 and the energy radiating members 402 and 403 are provided on the outer peripheral surface of the pipe in this manner, even if the pipe 400 is a capillary having a small diameter, the energy from the heater 41 can be absorbed efficiently, and also the heat energy can surely be radiated toward the infrared ray detecting sensors 42 and 43.

Figure 5:
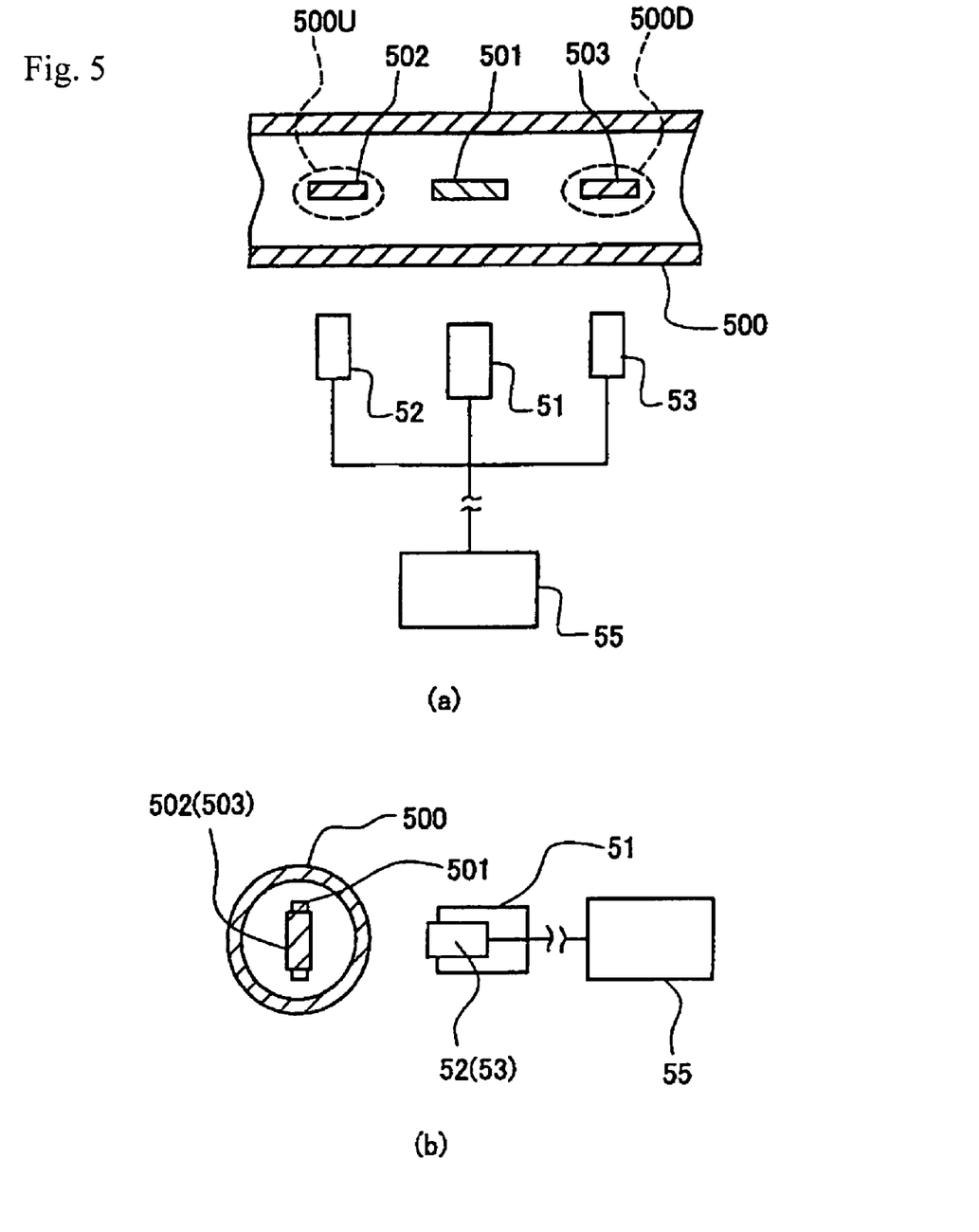

Next, a fourth modification of this embodiment is explained. As shown in FIG. 5, a flow sensor 5 in accordance with the fourth modification has an energy absorbing member 501 within a pipe in addition to the second modification shown in FIG. 3, the energy absorbing member 501 efficiently absorbing energy radiated from a heater 51 and generating heat. Also, energy-radiating members 502 and 503 are provided within the pipe so as to form an upstream-side energy radiating region 500U and a downstream-side energy radiating region 500D on the upstream side and the downstream side, respectively, of the heated portion in the pipe. In the case of this modification, the energy absorbing member 501 and the energy radiating members 502 and 503 are formed by a plate material of a corrosion resistant metal such as stainless steel, ceramics, sapphire, or the like.

The flow sensor in accordance with the fourth modification is used especially in the case where the fluid to be measured is a liquid, and is attached to the pipe 500 formed of a resin permeable to infrared rays. For such a resin-made pipe 500, the heat conductivity of the pipe itself is low, so that the pipe itself is difficult to heat directly. Therefore, the heat from the heater 51 transfers in the pipe 500 and the fluid, and the upstream-side energy radiating region and the downstream-side energy radiating region are less prone to be formed. However, by providing the energy absorbing member 501 and the energy radiating members 502 and 503, the fluid to be measured is heated directly via the energy absorbing member 501, and also the heat transfers from the fluid to be measured to the energy radiating member 502 arranged on the pipe upstream side of the heated region, and this portion serves as the upstream-side heat energy radiating region 500U. Similarly, the energy-radiating member 503 arranged on the pipe downstream side of the heated region forms the downstream-side heat energy radiating region 500D. Thereby, the temperature of fluid to be measured in the pipe can be measured through the pipe wall of the pipe 500, and therefore even if a resin-made pipe 500 is used, the flow rate of fluid to be measured can be measured exactly. Also, since the energy absorbing member 501 and the energy radiating members 502 and 503 are formed of a corrosion resistant metal such as stainless steel, ceramics, sapphire, or the like, even if the fluid to be measured is a corrosive liquid such as acid and alkali, the flow rate can be measured for a long period of time.

The infrared permeability of the resin-made pipe is determined by the material and thickness thereof. The permeability is higher when polyethylene, polypropylene, polyester, or the like is used as the pipe material, and the thickness of pipe is smaller. In terms of corrosion resistance, Teflon (registered trade name) etc. are preferable.

The whole or a part of the energy absorbing member 501 and the energy radiating members 502 and 503 preferably has a black color as in the case of the above-described third modification. The portion blackened in this manner has an emissivity of about 1, so that the heat receiving property and the heat releasing property are high, and thus the flow rate can be measured with high sensitivity and response.

Figure 6:
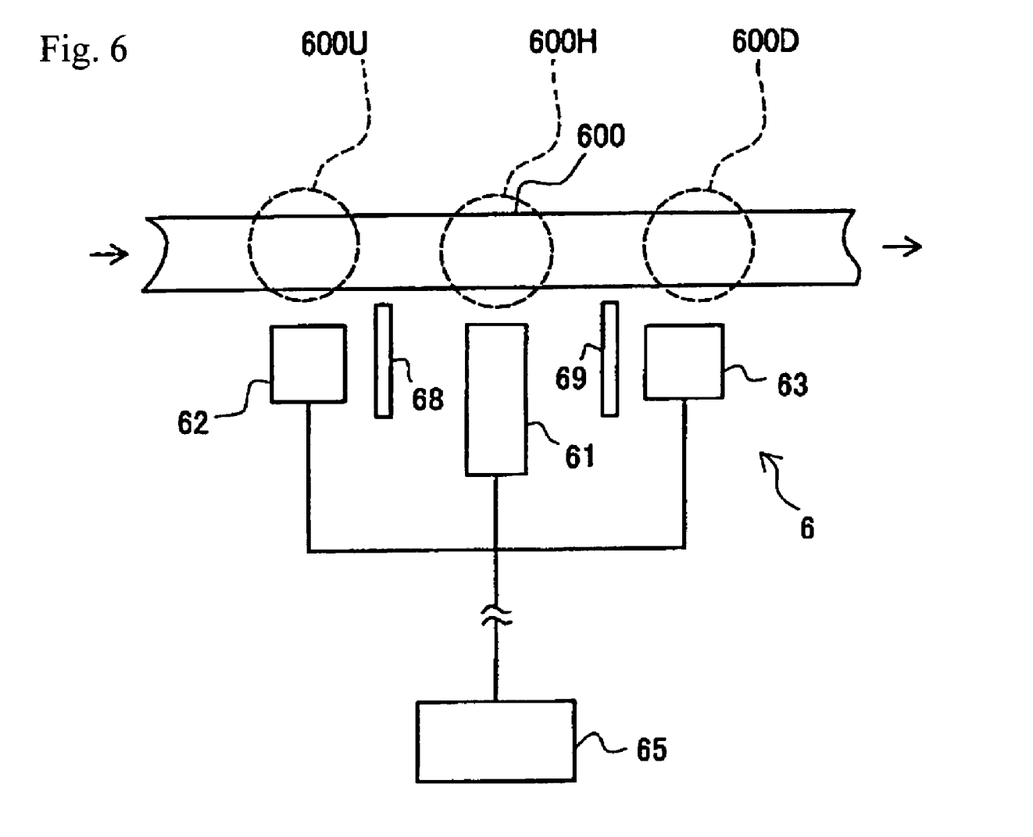
FIG. 6 is plan view schematically showing a fifth modification of the flow sensor shown in FIG. 1.

Next, a fifth modification of this embodiment is explained. As shown in FIG. 6, a flow sensor 6 in accordance with the fifth modification has energy shield plates 68 and 69 in addition to the configuration of the flow sensor 3 in accordance with the second modification shown in FIG. 3, the energy shield plates 68 and 69 being provided between a heater 61 and infrared ray detecting sensors 62 and 63 to prevent the energy radiated from the heater 61, which is a non-contact heating means, from reaching the infrared ray detecting sensors 62 and 63 directly or by reflection. Thereby, the energy radiated from the heater 61 is prevented from being transmitted directly to the infrared ray detecting sensors 62 and 63, so that the temperatures of an upstream-side heat energy radiating region 600U and a downstream-side heat energy radiating region 600D of a pipe 600 or the fluid in the pipe 600 are measured exactly, and therefore the flow rate of fluid to be measured in the pipe can be measured exactly.

Figure 7:
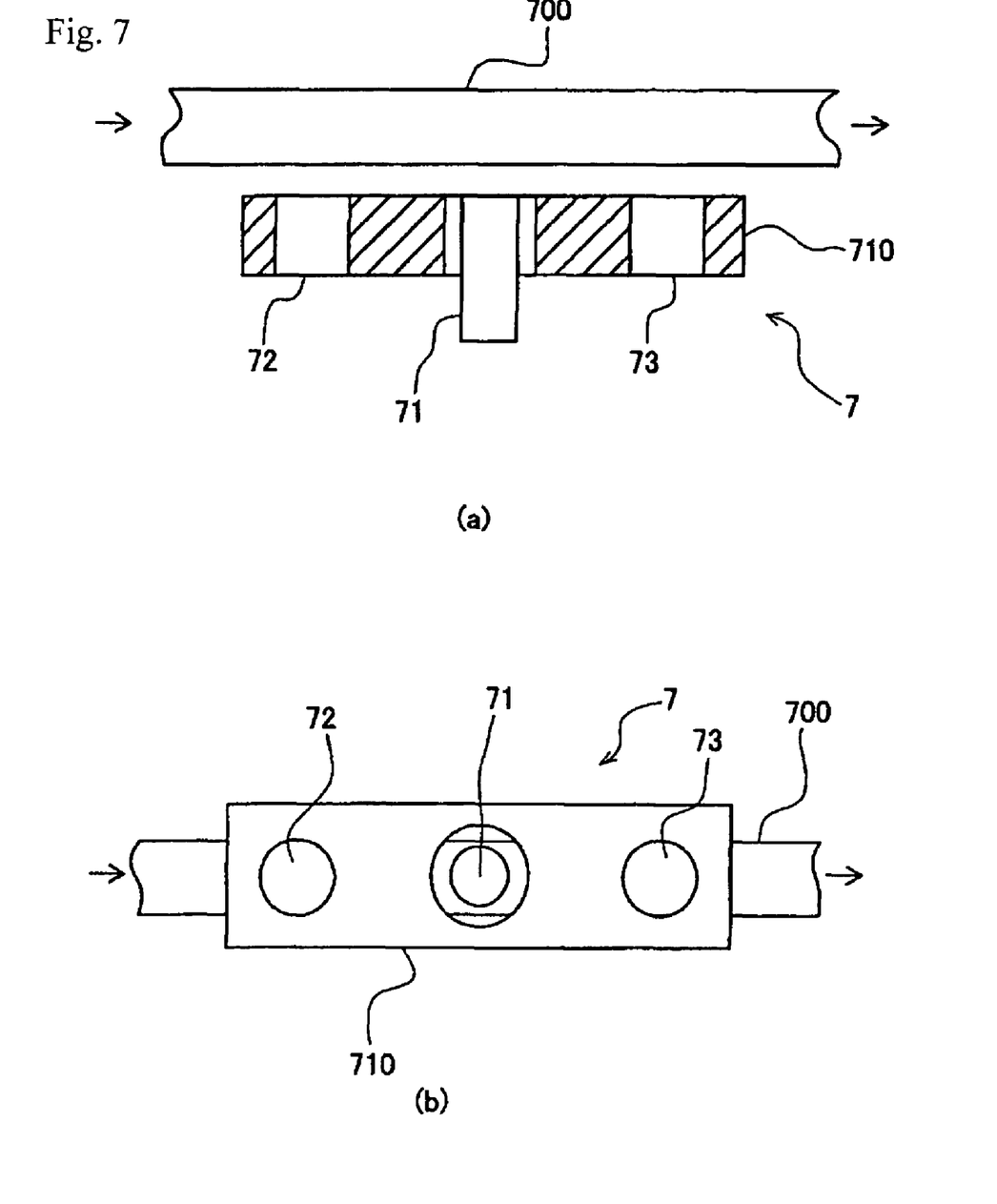
FIG. 7 is schematic construction views showing a sixth modification of the flow sensor shown in FIG. 1, FIG. 7(a) being a plan view showing a base member in cross section viewed from the upside of a pipe conduit, and FIG. 7(b) being a side view showing the base member from the side of the pipe conduit, corresponding to FIG. 7(a)

Next, a sixth modification of this embodiment is explained. As shown in FIG. 7, a flow sensor 7 in accordance with the sixth modification has a slender base member 710 in addition to the configuration of the flow sensor 3 in accordance with the second modification shown in FIG. 3, the base member 710 being arranged in the lengthwise direction of a pipe 700 in such a manner as to be not in contact with the pipe 700. The base member 710 is formed of a material having a high heat conductivity, for example, a metal such as copper and aluminum or ceramics, and the heat capacity thereof is so high that an almost uniform temperature is kept over the whole of the base member. A heater 71 is arranged in a through hole formed in a substantially central portion of the base member 710 with a certain clearance being provided between the heater 71 and the base member 710 so that the heat of the heater 71 is not transmitted directly to the base member 710. Also, infrared ray detecting sensors 72 and 73 are arranged near both ends of the base member 710.

If the temperatures of the infrared ray detecting sensors themselves shift from each other, the shift produces an error in measuring the flow rate. By causing temperatures of the infrared ray detecting sensors themselves to coincide with each other via the base member 710, such a trouble is prevented, and thereby the flow rate can be measured exactly.

Even if, unlike this modification, the heater 71 is arranged at a place different from the base member 710 to heat a part of the pipe 700, the same effect can be achieved.

Figure 8:
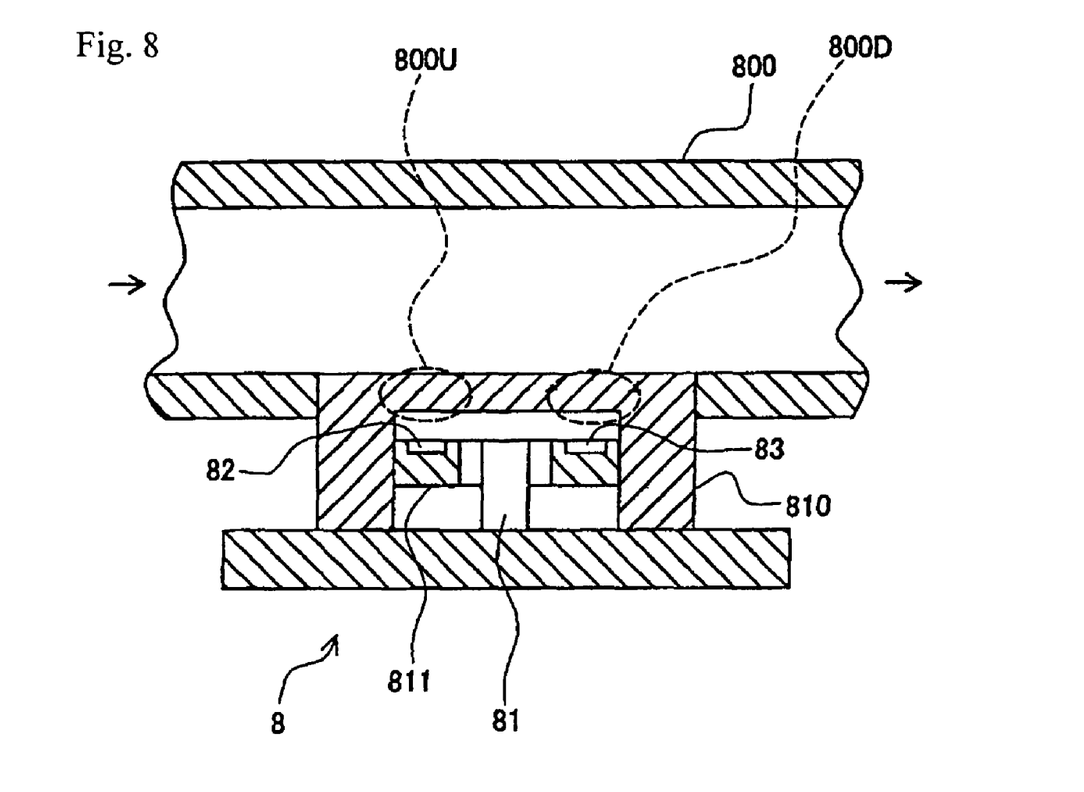
FIG. 8 is a schematic plan view showing a seventh modification of the flow sensor shown in FIG. 1, showing each component in cross section along the lengthwise direction of a pipe conduit.

Next, a seventh modification of this embodiment is explained. As shown in FIG. 8, a flow sensor 8 in accordance with the seventh modification has a header 810 a part of which is in contact with the fluid to be measured in a pipe, and a heater 81 and infrared ray detecting sensors 82 and 83 are arranged in the header so as to be close to a header thin-wall portion that is in contact with the fluid to be measured. The header thin-wall portion is disposed so as to project in the pipe or to have the same height as the pipe wall, and is in contact with the fluid to be measured. The upstream-side infrared ray detecting sensor 82 and the downstream-side infrared ray detecting sensor 83 are arranged in a base member 811 in the header so that a certain space is formed between the sensors and the thin-wall fluid contacting portion of the header 810. In this construction as well, the upstream-side infrared ray detecting sensor 82 and the downstream-side infrared ray detecting sensor 83 measure the temperatures of an upstream-side energy radiating region 800U and a downstream-side energy radiating region 800D of the header thin-wall portion, respectively, in a non-contact manner. In the case of this modification, the flow sensor 8 can be attached easily to a pipe, for example, having a large diameter as one unit. Thereby, even for a large-diameter pipe in which the pipe wall has a high heat capacity, the above-described measurement is made in the thin-wall portion having a low heat capacity of the header 810, so that the flow rate of fluid to be measured flowing in the pipe can be measured with high sensitivity and response.

Figure 9:
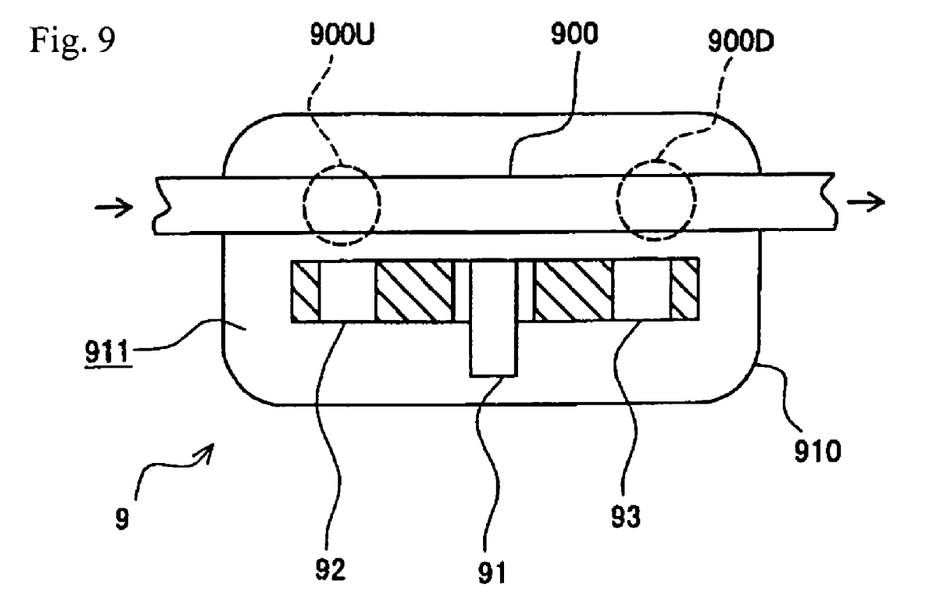
FIG. 9 is a schematic plan view showing an eighth modification of the flow sensor shown in FIG. 1, showing only a heater and a support member for an infrared ray detecting sensor in cross section.

Next, an eighth modification of this embodiment is explained. As shown in FIG. 9, a flow sensor 9 in accordance with the eighth modification has a housing 910 provided with a cavity 911 for keeping a heater 91, an upstream-side infrared ray detecting sensor 92, a downstream-side infrared ray detecting sensor 93, a heated region of a pipe 900, an upstream-side heat energy radiating region 900U and a downstream-side heat energy radiating region 900D in a vacuum or decompressed state. By this configuration, by isolating the measurement region including these components from the surrounding atmosphere, exact temperature measurement can be made without being subjected to disturbance such as convection due to the surrounding atmosphere and infrared absorption. Also, since the measurement portion is thermally insulated, the flow rate can be measured with high sensitivity and response.

As described above, the flow sensor in accordance with the present invention does not require manual work for forming an insulating film such as polyimide on the outer peripheral surface of pipe and winding a wire, which work is performed usually. Thereby, the winding is not subjected to a change in stress developed by the time change of the insulating film formed on the outer peripheral surface of pipe and an influence of stress exerted on the pipe, and thereby the flow rate can be measured exactly for a long period of time. Also, unlike the conventional case where a thin-film resistor is formed on the outer peripheral surface of pipe, there are no great difficulties in manufacturing, and the thin-film resistor itself is not subjected to an influence of distortion due to a stress applied to the pipe.

Also, in the case where a thermistor is attached to the outer peripheral surface of pipe as in the conventional example, since the thermistor itself has a large size and hence has a high heat capacity, it is difficult to measure the flow rate in the case of a small-diameter pipe. In the case of the flow sensor in accordance with the present invention, however, even for such a small-diameter pipe, the flow rate can be measured.

Also, after the thin-film resistor etc. have been attached to the outer peripheral surface of pipe, work for taking an electrode out of the pipe wall surface, which work involves difficulties in manufacturing, need not be performed.

Also, even in the case where the pipe is formed of a resin, the flow rate can be measured.

According to the flow sensor in accordance with the present invention, the flow rate of fluid to be measured flowing in various pipe conduits can be measured exactly.

In the case where a corrosive liquid such as acid or alkali is caused to flow by using Teflon (registered trade name) etc. as the pipe, as the heat energy absorbing member and the energy radiating member in the pipe, no metal is used, and ceramics, sapphire, or the like is preferably used.

Also, the flow sensor in accordance with the present invention has only to have a heating means for heating the fluid to be measured at a particular place, and the heating means may be or may not be in contact with the pipe conduit. As a method for heating the pipe conduit in a non-contact manner, laser beams such as a semiconductor laser, infrared rays, microwaves, and the like can be radiated, or the metal plate disposed in the metal pipe or the resin pipe can be heated by electromagnetic induction using an electromagnetic coil. Also, the pipe wall surface portion to which laser beams, infrared rays, etc. are radiated, and the light-receiving surface of the energy absorbing plate disposed on the pipe outer wall or in the resin pipe preferably have a black color.

Also, the whole of the measurement portion of the above-described flow sensor, especially the surroundings of the energy radiating region and the energy radiating means and the non-contact temperature detecting means (infrared ray detecting sensor), is preferably surrounded by a member configured so as to have a temperature approximately equal to the ambient temperature or a predetermined uniform temperature so as not to give disturbance to the temperature measurement using the non-contact temperature detecting means (infrared ray detecting sensor).

Needless to say, the use of the flow sensor in accordance with the present invention is not limited to the measurement of flow rate of fluid to be measured as described in the above-described embodiment, and the flow sensor can also measure the flow velocity.

Also, in the flow sensor in accordance with the above-described embodiment and various modifications, it is preferable that a correcting means be further provided to make substitute zero point correction by subtracting the output obtained by the infrared ray detecting sensor (non-contact temperature detecting means) in a state in which heating by the heater (heating means) is stopped from the output obtained by the infrared ray detecting sensor at the time of heating.

Specifically, after the heater, which is a heating means, has turned off and some time has elapsed, the output (substitute zero output) in a state in which the outputs of the upstream-side and downstream-side infrared ray detecting sensors become stable is subtracted from the output that is obtained from the infrared ray detecting sensor in the ordinary state in which the heater is heated and stored temporarily, by which substitute zero point correction is made. This operation is repeated in a predetermined cycle, and the output difference obtained by this operation is made a flow rate output. By providing such a substitute zero point correcting means, even in the case where it is impossible to calibrate the zero point (output at the time of zero flow rate) by stopping the flow of fluid to be measured to specially make zero point correction, a shift of zero point caused by time change etc. of the non-contact temperature detecting means such as the infrared ray detecting sensor is corrected by substitute zero point correction using this correcting means, and thereby the detection accuracy can be maintained. In the above-described substitute zero point correction, exactly, the substitute zero output is different from the temperatures (outputs) detected by the upstream-side and downstream-side infrared ray detecting sensors at the time when the heater is on and the flow rate is zero, so that perfect correction cannot be made. However, in the case where the time change etc. of the non-contact temperature detecting means is large, a great effect can be achieved.

Also, the initial substitute zero output (outputs of upstream-side and downstream-side infrared ray detecting sensors in a state in which the heater is off) is stored, and the heater is turned off periodically in the use state to determine the substitute zero output, and the determined substitute zero output is compared with the initial value, by which the time change etc. of the non-contact temperature detecting means can be checked, and the shift of zero point can also be corrected based on the shift amount (by calculation). The substitute zero point correction using this method has only to be made appropriately, for example, once or several times per year.

The invention claimed is:

1. A flow sensor for detecting the flow rate of a fluid to be measured flowing in a flow path, comprising:
   a heating means for heating a partial region of the outer wall surface of a pipe forming the flow path or for heating a particular region in the pipe; and
   temperature detecting means for measuring the temperatures of heat energy radiating regions for radiating the temperature influence from the heated region to the outside as heat energy, the heat energy radiating regions being regions on the upstream side and the downstream side of the pipe with respect to the heated region,
   wherein the temperature detecting means comprise an upstream-side non-contact temperature detecting means and a downstream-side non-contact temperature detecting means arranged near the outer wall surface of the pipe in a state of being not in contact with the outer wall surface, and the non-contact temperature detecting means can measure the temperatures of the upstream-side heat energy radiating region and downstream-side heat energy radiating region in a state of being not in contact with the outer wall surface of the pipe,
   the flow rate of the fluid to be measured flowing in the flow path is measured from the temperature difference between the temperatures of the upstream-side heat energy radiating region and downstream-side heat energy radiating region measured by the non-contact temperature detecting means or from the output caused by the temperature difference, and
   wherein an energy shielding means is provided between the heating means and the non-contact temperature detecting means to prevent the heat energy radiated from the heating means from being transmitted directly to the non-contact temperature detecting means, the energy shielding means comprising energy shield plates provided between the heating means and the non-contact temperature detecting means.

2. The flow sensor according to claim 1, wherein the non-contact temperature detecting means comprise an infrared sensor.

3. The flow sensor according to claim 2, wherein a heat energy radiating means which absorbs heat transferred from the heated region and radiates the heat to the outside is provided in the upstream-side heat energy radiating region and the downstream-side heat energy radiating region on the wall surface of or within the pipe forming the flow path.

4. The flow sensor according to claim 2, wherein at least a part of the heat energy-radiating region in which the temperature is measured in a non-contact manner by the non-contact temperature detecting means has a black color.

5. The flow sensor according to claim 2, wherein the upstream-side non-contact temperature detecting means and the downstream-side non-contact temperature detecting means are arranged in a common member for keeping the temperatures of the temperature detecting means themselves almost uniform.

6. The flow sensor according to claim 1, wherein a heat energy radiating means which absorbs heat transferred from the heated region and radiates the heat to the outside is provided in the upstream-side heat energy radiating region and the downstream-side heat energy radiating region on the wall surface of or within the pipe forming the flow path.

7. The flow sensor according to claim 6, wherein the heat energy radiating means is formed of a material having a high heat conductivity arranged on the wall surface of or within the pipe forming the flow path.

8. The flow sensor according to claim 7, wherein at least a part of the heat energy-radiating region in which the temperature is measured in a non-contact manner by the non-contact temperature detecting means or at least a part of the heat energy radiating means has a black color.

9. The flow sensor according to claim 6, wherein at least a part of the heat energy-radiating region in which the temperature is measured in a non-contact manner by the non-contact temperature detecting means or at least a part of the heat energy radiating means has a black color.

10. The flow sensor according to claim 1, wherein at least a part of the heat energy-radiating region in which the temperature is measured in a non-contact manner by the non-contact temperature detecting means has a black color.

11. The flow sensor according claim 1, wherein the upstream-side non-contact temperature detecting means and the downstream-side non-contact temperature detecting means are arranged in a common member for keeping the temperatures of the temperature detecting means themselves almost uniform.

12. The flow sensor according to claim 1, wherein both of the heating means and the non-contact temperature detecting means are arranged in a header a part of which is inserted in the flow path of the pipe.

13. The flow sensor according to claim 1, wherein a housing is provided to keep the heated region and the upstream-side and downstream-side heat energy radiating regions in a vacuum or decompressed state.

14. The flow sensor according to claim 1, wherein a control means is provided to control the heating means so that the sum or the average value of the temperatures which are detected by the upstream-side non-contact temperature detecting means and downstream-side non-contact temperature detecting means is always higher by a certain value than the ambient temperature.

15. The flow sensor according to claim 1, wherein a correcting means is further provided to make substitute zero point correction by subtracting the output obtained by the non-contact temperature detecting means in a state in which heating by the heating means is stopped from the output obtained by the non-contact temperature detecting means at the time of heating by the heating means.

* * * * *